United States Patent
Cheng et al.

(10) Patent No.: US 12,150,159 B2
(45) Date of Patent: Nov. 19, 2024

(54) RADIO IN-DEVICE COEXISTENCE IN WIDEBAND SYSTEM

(71) Applicant: QUALCOMM Incorporated, San Diego, CA (US)

(72) Inventors: Peng Cheng, Beijing (CN); Xiaoxia Zhang, San Diego, CA (US); Gavin Bernard Horn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/630,051

(22) PCT Filed: Aug. 15, 2019

(86) PCT No.: PCT/CN2019/100713
§ 371 (c)(1),
(2) Date: Jan. 25, 2022

(87) PCT Pub. No.: WO2021/026857
PCT Pub. Date: Feb. 18, 2021

(65) Prior Publication Data
US 2022/0346109 A1    Oct. 27, 2022

(51) Int. Cl.
*H04L 12/24* (2006.01)
*H04L 5/00* (2006.01)
(Continued)

(52) U.S. Cl.
CPC ......... *H04W 72/542* (2023.01); *H04L 5/0035* (2013.01); *H04L 5/0092* (2013.01); *H04W 72/1215* (2013.01)

(58) Field of Classification Search
CPC ............... H04L 5/0035; H04L 5/0092; H04W 72/1215; H04W 72/542
See application file for complete search history.

(56) References Cited

U.S. PATENT DOCUMENTS

| 2012/0213116 A1 | 8/2012 | Koo et al. |
| 2013/0303214 A1 | 11/2013 | Ahmadi |

(Continued)

FOREIGN PATENT DOCUMENTS

| CN | 109995457 A | 7/2019 |
| CN | 109996351 A | 7/2019 |

(Continued)

OTHER PUBLICATIONS

International Search Report and Written Opinion issued in corresponding International Application No. PCT/CN2019/100713 dated May 23, 2020.

(Continued)

*Primary Examiner* — Phuc H Tran
(74) *Attorney, Agent, or Firm* — Arent Fox, LLP

(57) ABSTRACT

In some wireless systems (e.g., 5G new radio (NR) systems), a user equipment (UE) may experience coexistence interference when using collocated radio transceivers to simultaneously communicate using different radio access technologies (RATs). To mitigate the coexistence interference, the UE may transmit a configuration request to a base station, where the configuration request may identify that the UE is operating on multiple RATs and identify that the UE is experiencing coexistence interference. Aspects of the present disclosure may further provide techniques for coexistence interference mitigation in wideband systems by allowing the UE to indicate the specific bandwidth parts (BVVPs) that are impacted by IDC interference to the base station such that the network can resolve the IDC interference by reconfiguring the bandwidth, instead of performing inter-frequency handover or removing/deactivating affected SCells.

14 Claims, 10 Drawing Sheets

(51) Int. Cl.
  *H04W 72/12* (2023.01)
  *H04W 72/542* (2023.01)

(56) References Cited

U.S. PATENT DOCUMENTS

| | | | |
|---|---|---|---|
| 2014/0050134 A1 | 2/2014 | Ahn et al. | |
| 2015/0249947 A1 | 9/2015 | Zhang et al. | |
| 2016/0234852 A1* | 8/2016 | Ko | H04W 72/541 |
| 2020/0106674 A1* | 4/2020 | Van Der Velde | H04W 52/0238 |
| 2021/0315026 A1* | 10/2021 | Jung | H04W 56/001 |

FOREIGN PATENT DOCUMENTS

| | | | | |
|---|---|---|---|---|
| WO | 2013142981 A1 | 10/2013 | | |
| WO | WO-2017030480 A1 * | 2/2017 | | H04L 5/001 |
| WO | 2019128579 A1 | 7/2019 | | |

OTHER PUBLICATIONS

Vivo et al., "Challenges for in-device coexistence in NR" 3GPP TSG-RAN WG2 Meeting #101, R2-1802100, Mar. 2, 2018, Section 2-3.

LG Electronics Inc., "IDC Procedure for EN-DC" 3GPP TSG-RAN2#101 bis, R2-1806024, Apr. 20, 2018, Section 2-3.

Ericsson, "Partial band CSI reporting" 3GPP TSG-RAN WG1 NR Ad Hoc #3 RI-1716360, Sep. 21, 2017, Sections 2-4.

LG Electronics Inc., "IDC Procedure for EN-DC" 3GPP TSG-RAN2#102, R2-1808559, May 25, 2018, Sections 2-3.

Samsung: "Bandwidth for IDC Reporting with NR", 3GPP TSG-RAN WG2 meeting #104, R2-1817726, 3rd Generation Partnership Project, Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 12, 2018, XP051557249, 3 Pages, Retrieved on Nov. 12, 2018, The Whole Document.

Supplementary European Search Report—EP19941312—Search Authority—The Hague—Mar. 16, 2023.

Vivo: "Discussion on the IDC Solutions for NR SA", 3GPP TSG-RAN WG2 NR AH1807 Meeting, R2-1809880, 3rd Generation Partnership Project, Mobile Competence Centre, 650, Route Des Lucioles, F-06921 Sophia-Antipolis Cedex, France, vol. RAN WG2, No. Montreal, Canada, Jul. 2, 2018-Jul. 6, 2018, Jun. 22, 2018, XP051525705, 5 Pages, Retrieved on Jun. 22, 2018, The Whole Document.

* cited by examiner

RADIO IN-DEVICE COEXISTENCE IN WIDEBAND SYSTEM

This application is a 35 U.S.C. § 371 National Phase of PCT Application No. PCT/CN2019/100713, filed Aug. 15, 2019, the disclosures of which are hereby incorporated by reference in their entireties.

BACKGROUND

The present disclosure relates to wireless communication systems, and more particularly, techniques for coexistence interference mitigation in wideband system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless systems (e.g., 5G or new radio (NR) systems), a user equipment (UE) may access multiple networks using different radio access technologies (RATs). In some cases, the UE may communicate concurrently with the multiple networks using collocated radio transceivers. Concurrent communications with the collocated radio transceivers may result in coexistence interference at the UE (e.g., due to the different active RATs), which may be undetectable by a base station. To address this coexistence interference, the UE may perform internal coordination functions, which may be costly, complex, or may introduce latency.

SUMMARY

In some wireless systems (e.g., 5G or new radio (NR) systems), a user equipment (UE) may operate using multiple radios. In some cases, the UE may simultaneously communicate using different radio access technologies (RATs) with a first radio and a second radio, and may experience coexistence interference between the first radio and the second radio (e.g., because signals associated with one radio may be received at the other). A base station communicating with the UE may not be able to detect the coexistence interference. Therefore, the UE may transmit an indication, such as a configuration request, to the base station in order to identify the coexistence interference.

Aspects of the present disclosure provide techniques for coexistence interference mitigation in wideband systems by allowing the UE to indicate the specific bandwidth parts (BWPs) that are impacted by in-device coexistence (IDC) interference to the base station such that the network can resolve the IDC interference by reconfiguring the bandwidth, instead of performing inter-frequency handover or removing/deactivating affected SCells.

In one example, a method for wireless communication implemented by a user equipment is disclosed. The method may include receiving, at a first radio access technology (RAT) transceivers of the UE, a first signal from a first network. The method may further include receiving, at a second RAT transceiver of the UE, a second signal from a second network. The method may further include detecting in-device coexistence (IDC) interference at the UE from the first signal and the second signal on at least one bandwidth part (BWP), wherein the BWP is a contiguous subset of physical resource blocks (PRBs) from a set of PRBs on a wideband carrier. The method may further include generating an IDC interference indication message that includes a BWP identification (ID) associated with the at least one BWP where the UE detects IDC interference. The method may further include transmitting the IDC interference indication message to a base station.

In another example, a UE for wireless communications. The UE may include a memory having instructions and a processor configured to execute the instructions to receive, at a first RAT transceivers of the UE, a first signal from a first network. The processor may further be configured to execute the instructions to receiving, at a second RAT transceiver of the UE, a second signal from a second network. The processor may further be configured to execute the instructions to detecting IDC interference at the UE from the first signal and the second signal on at least one BWP, wherein the BWP is a contiguous subset of PRBs from a set of PRBs on a wideband carrier. The processor may further be configured to execute the instructions to generate an IDC interference indication message that includes a BWP ID associated with the at least one BWP where the UE detects IDC interference. The processor may further be configured to execute the instructions to transmit the IDC interference indication message to a base station.

In some aspects, a non-transitory computer readable medium includes instructions stored therein that, when executed by a processor, cause the processor to perform the steps of receiving, at a first radio access technology (RAT) transceivers of the UE, a first signal from a first network. The computer readable medium may further include instructions for receiving, at a second RAT transceiver of the UE, a second signal from a second network. The computer readable medium may further include instructions for detecting in-device coexistence (IDC) interference at the UE from the first signal and the second signal on at least one bandwidth part (BWP), wherein the BWP is a contiguous subset of physical resource blocks (PRBs) from a set of PRBs on a wideband carrier. The computer readable medium may further include instructions for generating an IDC interference indication message that includes a BWP identification (ID) associated with the at least one BWP where the UE detects IDC interference. The computer readable medium may further include instructions for transmitting the IDC interference indication message to a base station.

In certain aspects, an apparatus includes means for receiving, at a first radio access technology (RAT) transceivers of the UE, a first signal from a first network. The apparatus may further include means for receiving, at a second RAT transceiver of the UE, a second signal from a second network. The apparatus may further include means for detecting in-device coexistence (IDC) interference at the UE from the first signal and the second signal on at least one bandwidth part (BWP), wherein the BWP is a contiguous subset of physical resource blocks (PRBs) from a set of PRBs on a wideband carrier. The apparatus may further include means for generating an IDC interference indication message that includes a BWP identification (ID) associated with the at least one BWP where the UE detects IDC interference. The apparatus may further include means for transmitting the IDC interference indication message to a base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
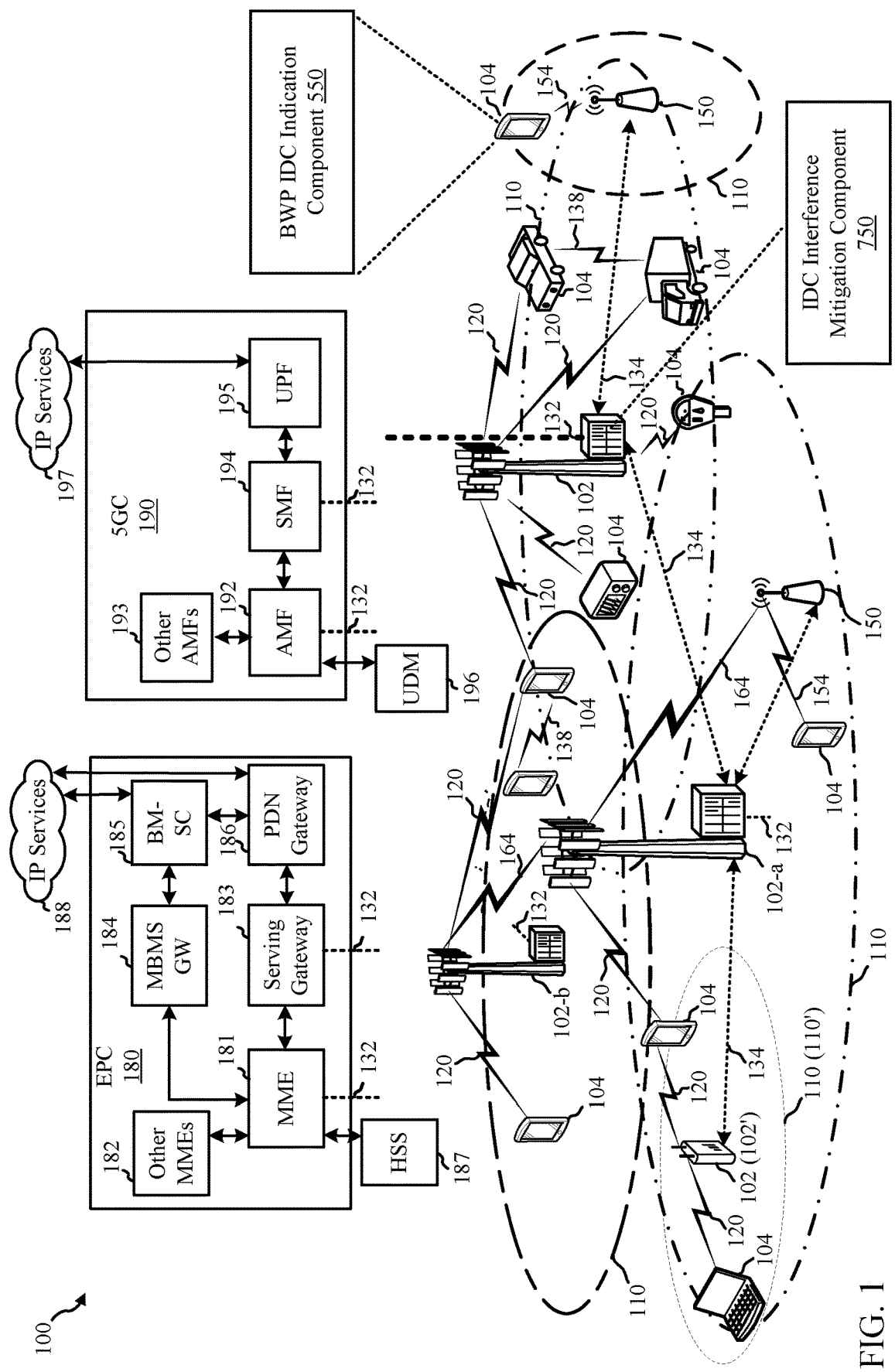
FIG. 1 is a schematic diagram of an example wireless communications system that supports coexistence interference mitigation in accordance with aspects of the present disclosure.

In some wireless systems (e.g., 5G or new radio (NR) systems), a user equipment (UE) may include multiple collocated radios, which may allow the UE to communicate with different networks concurrently (e.g., by operating different radios associated with different radio access technologies (RATs)). The collocated radios may interfere with one another, resulting in in-device coexistence (IDC) interference. For example, signals from first RAT (e.g., long term evolution (LTE) signals) in certain bands can interfere with or be interfered by signals from second RATs (e.g., WLAN, Bluetooth, Global Navigation Satellite System, 5G, etc.) within the same device. Specifically, due to the extreme proximity of multiple radio transceivers within the same UE operating on adjacent frequencies or sub-harmonic frequencies, the interference power coming from a transmitting of collocated radio may be much higher than the actual received power level of the desired signal for a receiver. A base station communicating with the UE, however, may not be able to detect the IDC interference at the UE. Accordingly, the UE may transmit a configuration request to the base station that may include an indication that multiple RATs are active and that the IDC interference is present at the UE.

In response to the indication of the IDC interference, the network may perform an inter-frequency handover of the UE or remove/deactivate the affected secondary cell SCell. However, in some cases, particularly with respect to wideband operations, the UE may experience IDC interference only for certain parts of the bandwidth (e.g., first portion of the bandwidth), but may not be impacted on the remaining portion of the bandwidth (e.g., second portion of the bandwidth). Traditional approach of performing an inter-frequency handover of the UE or removing/deactivating the affected SCell may waste valuable bandwidth resources.

To this end, aspects of the present disclosure provide techniques for coexistence interference mitigation in wideband systems by allowing the UE to indicate the specific bandwidth parts (BWPs) that may be impacted by IDC interference to the base station such that the network can resolve the IDC interference by reconfiguring the bandwidth instead of performing inter-frequency handover or removing/deactivating affected SCells. In one example, the network (e.g., base station) may configure BWP identification (ID) associated with each serving frequency for which the UE may report IDC problems in an IDC interference indication message (e.g., "IndeviceCoexlndiciationNR message"). In such instance, the UE may monitor only the configured BWP(s) in each serving frequency (as opposed to the entire bandwidth) to determine if any BWPs are experiencing IDC interference at the UE, and based on the determination, report the BWP ID(s) to the base station in an IDC interference indication message. For example, a wideband bandwidth carrier of 400 MHz may be subdivided into four bandwidth parts (e.g., a first BWP, a second BWP, a third BWP, and a fourth BWP), each 100 MHz. Thus, if the network configures the UE for the second BWP of the candidate serving frequency, the UE may monitor only the second BWP and the BWP ID associated with the second BWP to the base station if the UE detects IDC interference at the second BWP that the UE is unable to resolve. In some examples, along with the BWP ID, the UE may also report the specific preferred time division multiplex (TDM) pattern (e.g., BWP dedicated TDM pattern), including but not limited to the discontinuous reception (DRX) pattern (e.g., DRX cycle length, DRX offset, and/or DRX active time), autonomous denial configuration (e.g., maximum number of denied subframes, validity period), hardware issue indication, etc. In some aspects, the BWP dedicated pattern may reflect different ISM interference in different BWPs.

In some aspects, in addition to the network configuring the BWP ID associated with each serving frequency for which the UE may report IDC problems, the network may also configure multiple subbands associated with each configured BWP ID for which the UE may report IDC problems in the IDC interference indication message. The configuration of each subband may include the subband ID, the frequency location which may include the reuse subbands configured for channel state information (CSI) reporting, starting frequency location and ending frequency location for each subband, and/or central frequency location and bandwidth for each subband. It should be appreciated that the total number of subbands that the network may configure the UE to monitor for IDC interference may not exceed the UE's monitoring capabilities (e.g., generally, configured subbands should be in edge of the associated BWP). Additionally or alternatively, the UE may select the subbands to monitor for IDC interference (as opposed to being configured by the network). For example, the UE may select the edge subbands in any given BWP.

Thus, if the subbands are configured for a particular BWP, the UE may report the affected subband ID to the base station when the UE experiences IDC interference in the subbands. In some aspects, in addition to the affected subband ID, the UE may also report the specific preferred TDM pattern (e.g., subband dedicated TDM pattern), including DRX pattern, autonomous denial configuration, and hardware issue indication) for each subband of the associated BWP ID. However, if there is no subband configured for a particular BWP, the UE may report the BWP dedicated TDM pattern.

In another example, the UE may monitor the entire bandwidth (e.g., entire 400 MHz wideband carrier in above example) and indicate the affected BWP ID(s) to the base station in an IDC interference indication message (e.g., "IndeviceCoexIndiciationNR message") for each of the corresponding BWPs for which the UE experiences IDC interference. In some examples, in addition to the affected BWP ID, the UE may again also report the specific preferred TDM pattern (e.g., BWP dedicated TDM pattern), including but not limited to the discontinuous reception (DRX) pattern (e.g., DRX cycle length, DRX offset, and/or DRX active time), autonomous denial configuration (e.g., maximum number of denied subframes, validity period), hardware issue indication, etc.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100 for coexistence interference mitigation in wideband system. As noted above, in some wireless systems, a UE 104 may operate using multiple radios. In some cases, the UE 104 may simultaneously communicate using different RATs with a first radio and a second radio, and may experience coexistence interference between the first radio and the second radio (e.g., because signals associated with one radio may be received at the other). A base station 102 communicating with the UE 104 may not be able to detect the coexistence interference. Therefore, the UE 104 may transmit an indication, such as a configuration request, to the base station in order to identify the coexistence interference. To this end, the UE 104 may include a BWP IDC indication component 550 (see FIG. 5) that allows the UE to indicate the specific bandwidth parts (BWPs) that are impacted by IDC interference to the base station 102 such that the network can resolve the IDC interference by reconfiguring the bandwidth, instead of performing inter-frequency handover or removing/deactivating affected SCells. Conversely, the base station 102 may include an IDC interference medication component 750 (see FIG. 7) that receives the configuration request from the UE 104 indicated the BWP ID on which the UE 104 is experiencing IDC interference and determine the IDC interference mitigation solution (e.g., FDM or TDM based solution) that should be adopted. Accordingly, the IDC interference medication component 750 may signal the IDC mitigation solution to the UE 104 to assist the UE 104 in resolving the IDC interference at the BWP identified in the configuration request.

The wireless communications system 100 may include one or more base stations 102, one or more UEs 104, and a core network, such as an Evolved Packet Core (EPC) 180 and/or a 5G core (5GC) 190. The one or more base stations 102 and/or UEs 104 may operate according to millimeter wave (mmW or mmWave) technology. For example, mmW technology includes transmissions in mmW frequencies and/or near mmW frequencies. Specifically, extremely high frequency (EHF) is part of the radio frequency (RF) in the electromagnetic spectrum where the EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave.

The EPC 180 and/or the 5GC 190 may provide user authentication, access authorization, tracking, internet protocol (IP) connectivity, and other access, routing, or mobility functions. The base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC 180 or the 5GC 190), with one another over backhaul links 132, 134 (e.g., Xn, X1, or X2 interfaces) which may be wired or wireless communication links.

The base stations 102 may wirelessly communicate with the UEs 104 via one or more base station antennas. Each of the base stations 102 may provide communication coverage for a respective geographic coverage area 110. In some examples, base stations 102 may be referred to as a base transceiver station, a radio base station, an access point, an access node, a radio transceiver, a NodeB, eNodeB (eNB), gNB, Home NodeB, a Home eNodeB, gNodeB (gNB), a relay, a transceiver function, a basic service set (BSS), an extended service set (ESS), a transmit reception point (TRP), or some other suitable terminology. The geographic coverage area 110 for a base station 102 may be divided into sectors or cells making up only a portion of the coverage area (not shown). The wireless communication network 100 may include base stations 102 of different types (e.g., macro base stations 102 or small cell base stations 180, described below).

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. The wireless communication network 100 may be a heterogeneous technology network in which different types of base stations provide coverage for various geographical regions. For example, each base station 102 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 104 with service subscriptions with the network provider. A small cell 150 may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 104 with service subscriptions with the network provider. A femto cell may also cover a small geographic area (e.g., a home) and may provide restricted access and/or unrestricted access by UEs 104 having an association with the femto cell (e.g., in the restricted access case, UEs 104 in a closed subscriber group (CSG) of the base station 102, which may include UEs 104 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 104 may be dispersed throughout the wireless communication network 100, and each UE 104 may be stationary or mobile. A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 104 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 104 may be able to communicate with various types of base stations 102 and network equipment including macro eNBs, small cell eNBs, macro gNBs, small cell gNBs, gNB, relay base stations, and the like.

UE 104 may be configured to establish one or more wireless communication links 120 with one or more base stations 102. The wireless communication links 120 shown in wireless communication network 100 may carry uplink (UL) transmissions from a UE 104 to a base station 102, or downlink (DL) transmissions, from a base station 102 to a UE 104. Each wireless communication link 120 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 120 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 120 may represent one or more broadcast channels.

In some aspects of the wireless communication network 100, base stations 102 or UEs 104 may include multiple antennas for employing antenna diversity schemes to improve communication quality and reliability between base stations 102 and UEs 104. Additionally or alternatively, base stations 102 or UEs 104 may employ multiple input multiple output (MIMO) techniques that may take advantage of multi-path environments to transmit multiple spatial layers carrying the same or different coded data.

Wireless communication network 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 104 may be configured with multiple downlink CCs and one or more uplink CCs for carrier aggregation. Carrier aggregation may be used with both FDD and TDD component carriers. The communication links 120 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communication network 100 may further include base stations 102 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
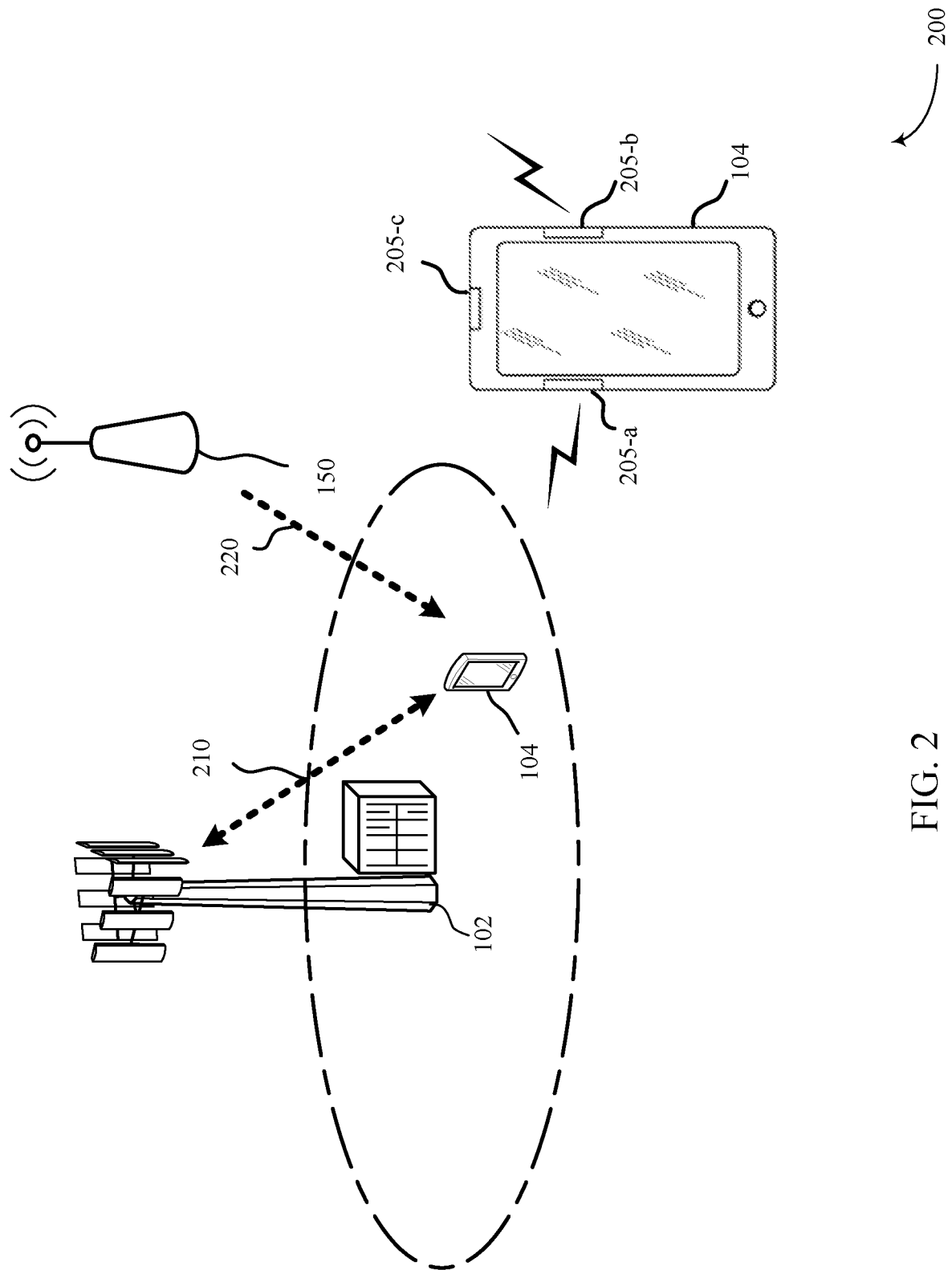
FIG. 2 is an example of a schematic diagram that supports coexistence interference mitigation in wireless systems in accordance with aspects of the present disclosure.

FIG. 2 illustrates an example of a wireless communications system 200 that supports coexistence interference mitigation in accordance with various aspects of the present disclosure. Wireless communications system 200 may include base station 102, a small cell eNB 150, and UE 104, which may be examples of the corresponding devices as described with reference to FIG. 1. UE 104 may communicate with base station 102 and small cell eNB 150 using different radio transceivers 205, and different RATs. For example, UE 104 may communicate with base station 102 over communication link 210 using radio transceiver 205-a, and may communicate with small cell eNB 150 over communication link 220 using radio transceiver 205-b. In some cases, UE 104 may include other radio transceivers 205, such as radio transceiver 205-c, which may be active or inactive Therefore, in some cases, the multiple radio transceivers 205 may operate using different RATs. For example, a radio transceiver 205 may support 5G, LTE, WiFi, Bluetooth, global navigation satellite system (GNSS), or any other RAT. UE 104 may access multiple networks simultaneously by operating multiple collocated radio transceivers 205. Due to the close proximity of the collocated radio transceivers 205, communicating with different networks concurrently may result in IDC interference. The IDC interference may be an example of bursty interference, where the amount of interference may vary drastically in both time and frequency (e.g., there may be specific times and frequencies with high levels of bursty IDC interference, while other times and frequencies may have minimal, or no bursty IDC interference). In one example, collocated LTE and GNSS radio transceivers 205, such as radio transceivers 205-*a* and 205-*b*, operating in adjacent or sub-harmonic frequencies may experience increased IDC interference (e.g., IDC interference that may not be completely eliminated with filtering) for certain frequency bands. In some cases, UE 104 may implement costly or complex intra-device coordination to handle the IDC interference. In some examples, the UE 104 may transmit indications (e.g., a configuration request) to the base station 102 to help mitigate the coexistence interference at the UE 104.

The base station 102, however, may not have information identifying whether UE 104 is communicating over multiple RATs or if the UE 104 is experiencing any IDC interference. In such cases, UE 104 may transmit an indication or other message to base station 102 to provide this information. For example, the indication may identify that UE 104 is concurrently operating using multiple RATs, with base station 102 and small cell eNB 150. In other cases, the indication may identify interference at UE 104 that base station 102 may not detect (e.g., IDC interference). Additionally or alternatively, the indication may specifically request a modification in reference signaling from base station 102. For example, the indication may request more frequent scheduling of CSI resources from base station 102. Accordingly, the base station 102 may perform link adaptation based on the received indication or the more frequently reported CSI in order to mitigate IDC interference at UE 104 and increase transmission throughput to UE 104.

In response to the indication of the IDC interference, the network may perform an inter-frequency handover of the UE or remove/deactivate the affected secondary cell SCell. However, as noted above, in some cases, particularly with respect to wideband operations, the UE 104 may experience IDC interference only for certain parts of the bandwidth (e.g., first portion of the bandwidth), but may not be impacted on the remaining portion of the bandwidth (e.g., second portion of the bandwidth). Traditional approach of performing an inter-frequency handover of the UE 104 or removing/deactivating the affected SCell may waste valuable bandwidth resources.

To this end, aspects of the present disclosure provide techniques for coexistence interference mitigation in wideband systems by allowing the UE 104 to indicate the specific BWPs that may be impacted by IDC interference to the base station 102 such that the network can resolve the IDC interference by reconfiguring the bandwidth instead of performing inter-frequency handover or removing/deactivating affected SCells.

Figure 3:
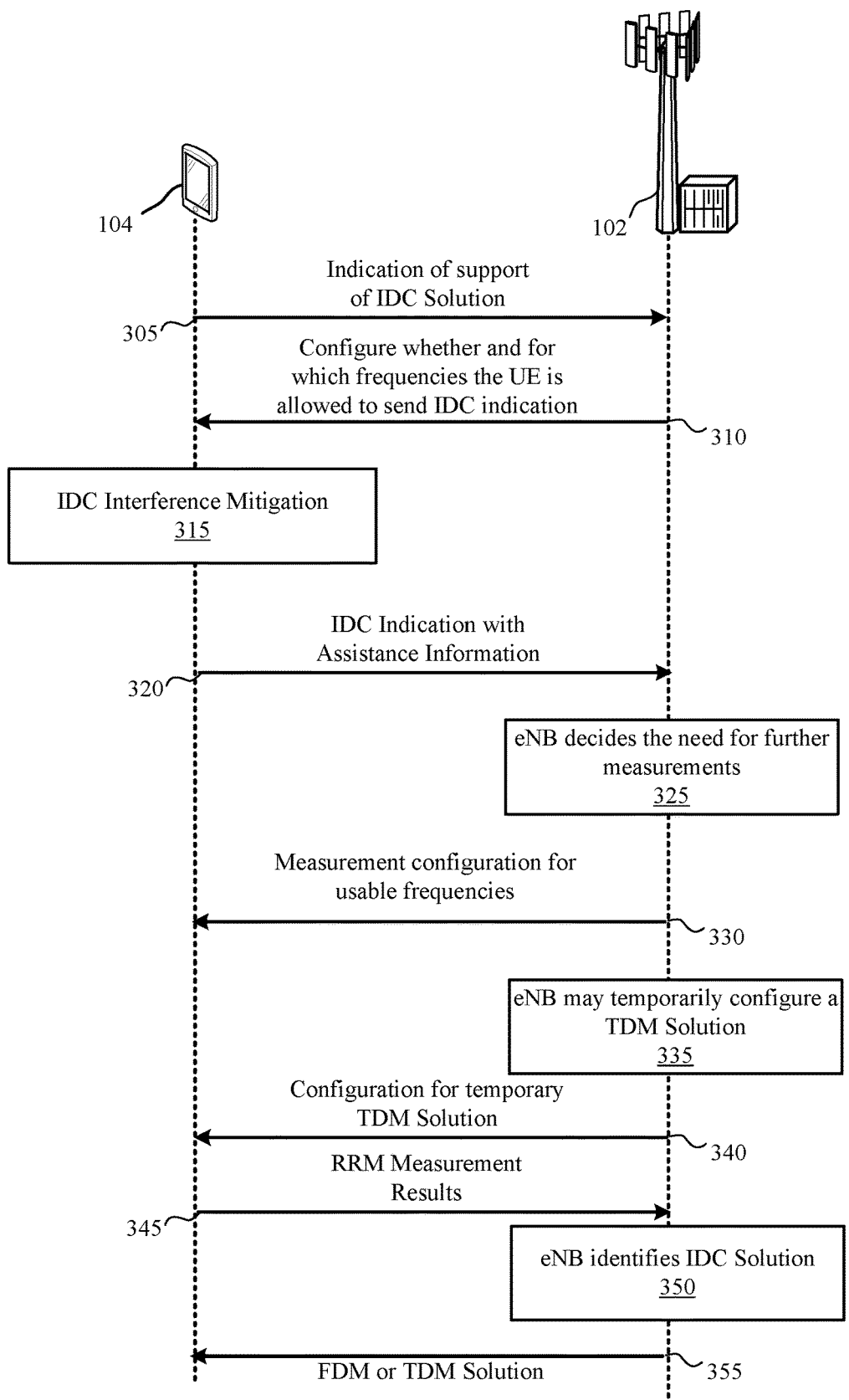
FIG. 3 is an example of a flowchart between a UE and a base station for mitigating IDC interference at the UE.

FIG. 3 is an example of a flowchart 300 between a UE 104 and a base station 102 for mitigating IDC interference at the UE 104. In some examples, the UE 104, at 305 may inform the base station 102 of the capability of IDC indication RRC message that may include indicating the capabilities of the UE to support one or more IDC solutions. At 310, the base station 102 may transmit a configuration message to the UE 104 indicating whether and for which frequencies the UE 104 is allowed to send IDC indication to the base station 104 if the UE 104 experiences IDC interferences.

At 315, the UE 104 may detect interference over a plurality of receivers from multiple RATs and attempt to resolve the IDC interference on its own. In some examples, if the network has configured the UE 104 with one or more BWPs, the UE may only monitor the specific BWPs that are associated with the UE 104. In other instances, the UE 104 may monitor the entire bandwidth for IDC interference. If the UE 104 detects IDC interference on one or more BWPs (or the bandwidth) and the UE 104 is unable to resolve the IDC interference on its own, the UE 104, at 320, may transmit an IDC interference indication message (e.g., "IndeviceCoexlndiciationNR message") to request that the base station 102 assist with IDC interference mitigation.

In some examples, the IDC interference indication message (e.g., "IndeviceCoexlndiciationNR message") may include the BWP ID associated with the BWP for which the UE 104 experiences IDC interference. In some examples, along with the BWP ID, the IDC interference indication message may also include the specific preferred TDM pattern (e.g., BWP dedicated TDM pattern), including but not limited to the DRX pattern (e.g., DRX cycle length, DRX offset, and/or DRX active time), autonomous denial configuration (e.g., maximum number of denied subframes, validity period), hardware issue indication, etc. In some aspects, the BWP dedicated pattern may reflect different ISM interference in different BWPs. In some aspects, in addition to the network configuring the BWP ID associated with each serving frequency for which the UE may report IDC problems, the network may also configure multiple subbands associated with each configured BWP ID for which the UE may report IDC problems in the IDC interference indication message. The configuration of each subband may include the subband ID, the frequency location which may include the reuse subbands configured for CSI reporting, starting frequency location and ending frequency location for each subband, and/or central frequency location and bandwidth for each subband. It should be appreciated that the total number of subbands that the network may configure the UE to monitor for IDC interference may not exceed the UE's monitoring capabilities (e.g., generally, configured subbands should be in edge of the associated BWP). Additionally or alternatively, the UE 104 may select the subbands to monitor for IDC interference (as opposed to being configured by the network). For example, the UE 104 may select the edge subbands in any given BWP.

Thus, if the subbands are configured for a particular BWP, the UE 104 may report the affected subband ID to the base station 102 in the IDC interference indication message at 320 when the UE 104 experiences IDC interference at the subbands. In some aspects, in addition to the affected subband ID, the UE 104 may also report the specific preferred TDM pattern (e.g., subband dedicated TDM pattern), including DRX pattern, autonomous denial configuration, and hardware issue indication) for each subband of the associated BWP ID. However, if there is no subband configured for a particular BWP, the UE may report the BWP dedicated TDM pattern.

In another example, as noted above, the UE 104 may monitor the entire bandwidth and indicate the affected BWP ID(s) to the base station in an IDC interference indication message (e.g., "IndeviceCoexlndiciationNR message") for each of the corresponding BWPs for which the UE 104 experiences IDC interference. In some examples, in addition to the affected BWP ID, the UE 104 may again also report the specific preferred TDM pattern (e.g., BWP dedicated TDM pattern), including but not limited to the discontinuous reception (DRX) pattern (e.g., DRX cycle length, DRX offset, and/or DRX active time), autonomous denial configuration (e.g., maximum number of denied subframes, validity period), hardware issue indication, etc.

In some aspects, the content of the IDC interference indication message from the UE 104 to the base station 102 may also include one or more of the FDM (e.g., list of affected frequencies indicated with MeasObject ID), Long-term TDM (e.g., desired active time, offset and periodicity for long-term TDM pattern), short-term TDM (one or more desired HARQ compliant bitmap), and/or Autonomous denials (e.g., UE will not transmit on some uplink subframes). However, the determination of whether the FDM or TDM-based IDC interference mitigation solution may be determined by the base station 104.

Thus, at 325, upon receiving the IDC interference indication message, the base station 104 may determine whether the base station 104 needs further channel measurements. At 330, the base station 104 may transmit a measurement configuration for usable frequencies to the UE 104. In the interim, at 335, the base station 104 may temporarily configure a TDM solution such that communication between the base station 102 and the UE 104 is time domain shifted to mitigate interference at the UE 104. At 340, the base station 104 may indicate the temporary TDM solution to the UE 104. At 345, the UE 104 may transmit RRM measurement results back to the base station 104 upon which the base station 104, at 350, may determine the proper IDC solution to employ (e.g., FDM or TDM solution). At 355, the base station 104 may signal to the UE 104 the IDC interference mitigation solution (e.g., FDM or TDM) determined by the base station 104.

Figure 4A:
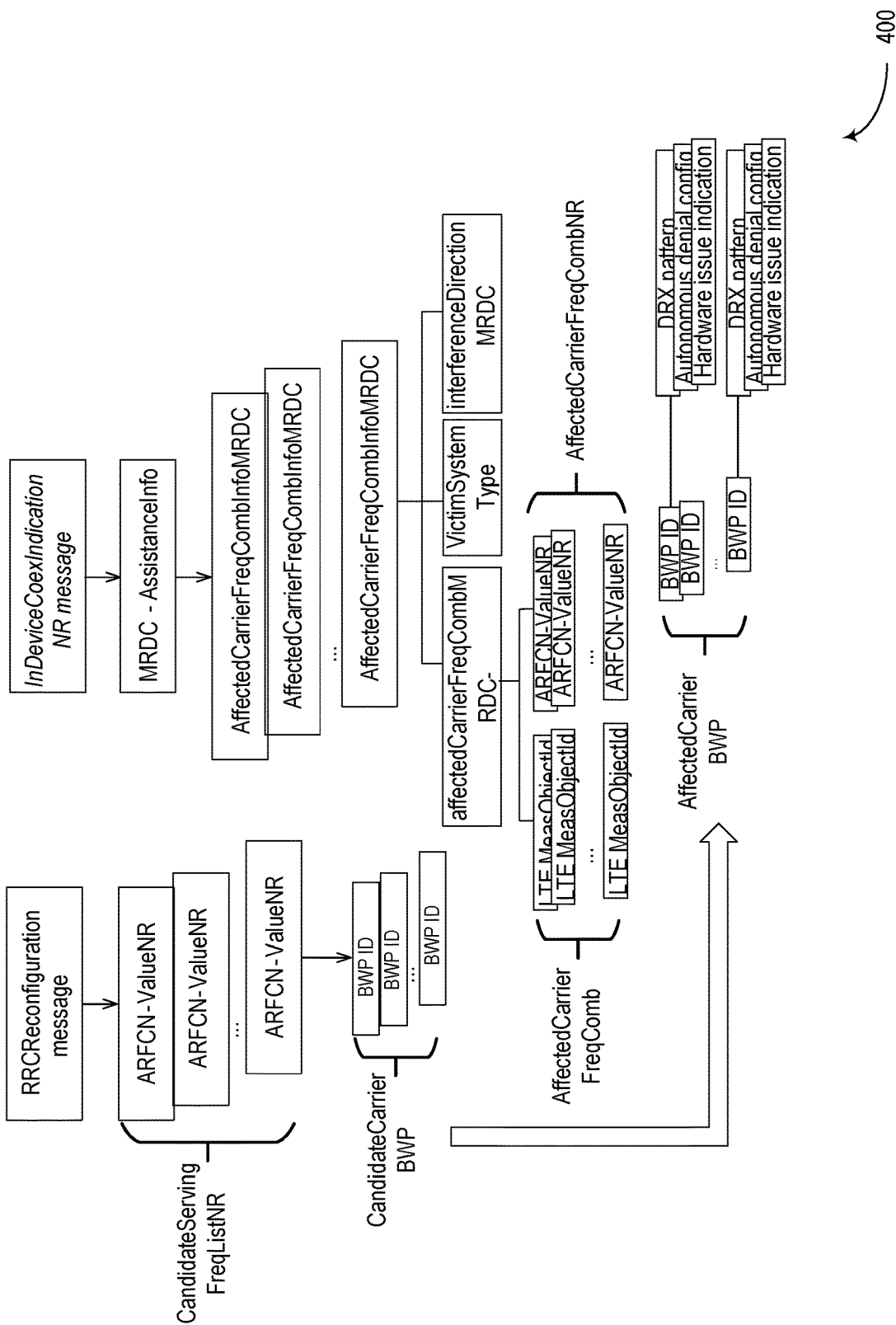
FIG. 4A is an example of messaging architecture of one example of mitigating IDC interference in accordance with aspects of the present disclosure.

FIG. 4A is an example of messaging architecture 400 of one example of mitigating IDC interference in accordance with aspects of the present disclosure. In this example, the network (e.g., base station 102), via RRCReconfiguration message transmitted to the UE 104 that identifies ARFC-value, may configure one or more BWP ID(s) associated with each serving frequency for which the UE may report IDC problems in an IDC interference indication message (e.g., "IndeviceCoexIndiciationNR message"). In such instance, the UE may monitor only the configured BWP(s) in each serving frequency (as opposed to the entire bandwidth) to determine if any BWPs are experiencing IDC interference at the UE, and based on the determination, report the BWP ID(s) to the base station in an IDC interference indication message. For example, a wideband bandwidth carrier of 400 MHz may be subdivided into four bandwidth parts (e.g., a first BWP, a second BWP, a third BWP, and a fourth BWP), each 100 MHz. Thus, if the network configures the UE for the second BWP of the candidate serving frequency, the UE may monitor only the second BWP and the BWP ID associated with the second BWP to the base station if the UE detects IDC interference at the second BWP that the UE is unable to resolve. In some examples, along with the BWP ID, the UE may also report the specific preferred time division multiplex (TDM) pattern (e.g., BWP dedicated TDM pattern), including but not limited to the discontinuous reception (DRX) pattern (e.g., DRX cycle length, DRX offset, and/or DRX active time), autonomous denial configuration (e.g., maximum number of denied subframes, validity period), hardware issue indication, etc. In some aspects, the BWP dedicated pattern may reflect different ISM interference in different BWPs.

Figure 4B:
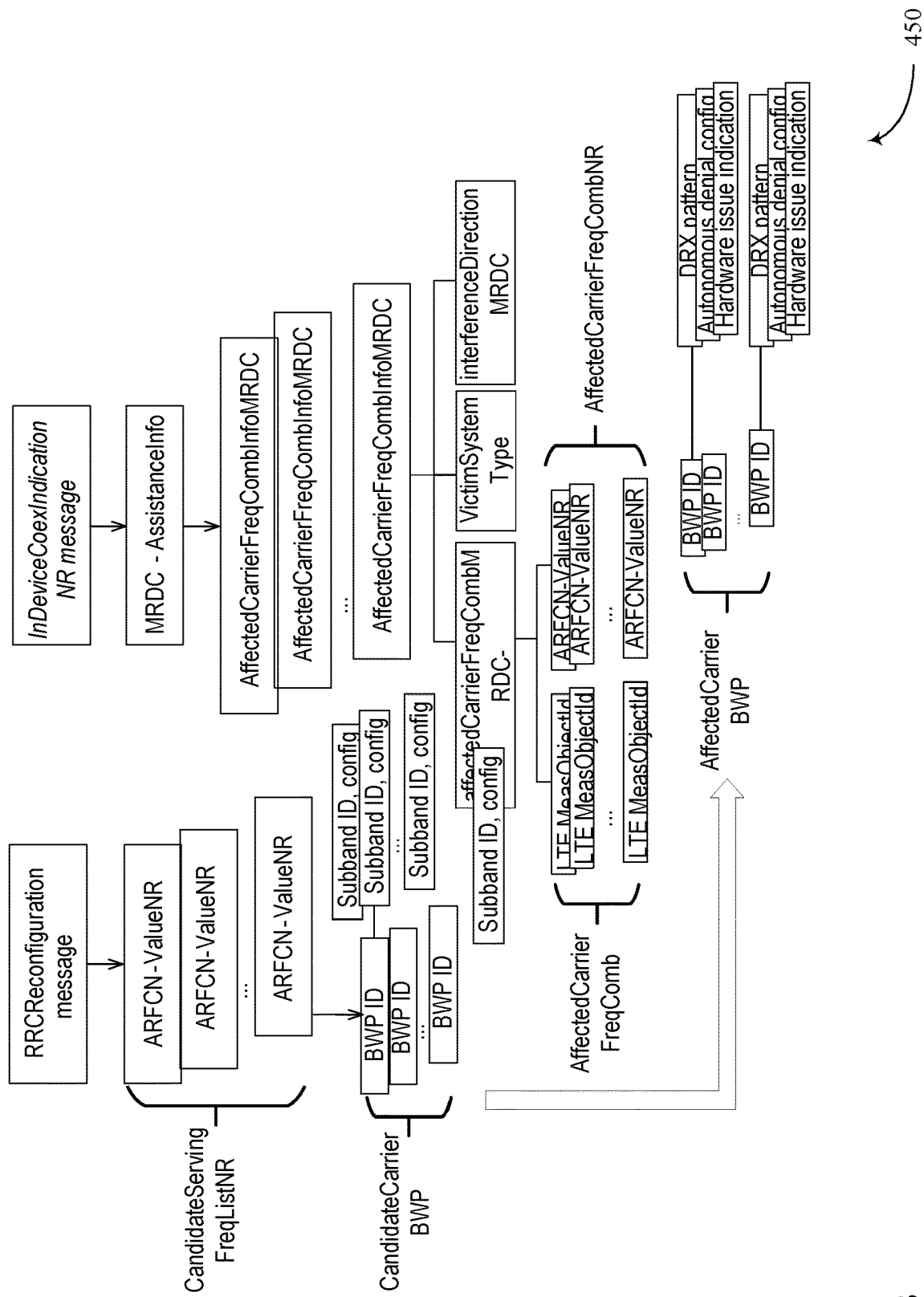
FIG. 4B is an example of messaging architecture of sub-band level IDC issue reporting for mitigating IDC interference that extends the messaging architecture of FIG. 4A in accordance with aspects of the present disclosure.

FIG. 4B is an example of messaging architecture 450 of sub-band level IDC issue reporting for mitigating IDC interference that extends the messaging architecture 400 discussed in FIG. 4A in accordance with aspects of the present disclosure. Specifically, in some aspects, in addition to the network configuring the BWP ID associated with each serving frequency for which the UE may report IDC problems, the network may also configure multiple subbands associated with each configured BWP ID for which the UE may report IDC problems in the IDC interference indication message. The configuration of each subband may include the subband ID, the frequency location which may include the reuse subbands configured for channel state information (CSI) reporting, starting frequency location and ending frequency location for each subband, and/or central frequency location and bandwidth for each subband. It should be appreciated that the total number of subbands that the network may configure the UE to monitor for IDC interference may not exceed the UE's monitoring capabilities (e.g., generally, configured subbands should be in edge of the associated BWP). Additionally or alternatively, the UE may select the subbands to monitor for IDC interference (as opposed to being configured by the network). For example, the UE may select the edge subbands in any given BWP.

Thus, if the subbands are configured for a particular BWP, the UE may report the affected subband ID to the base station when the UE experiences IDC interference at the subbands. In some aspects, in addition to the affected subband ID, the UE may also report the specific preferred TDM pattern (e.g., subband dedicated TDM pattern), including DRX pattern, autonomous denial configuration, and hardware issue indication) for each subband of the associated BWP ID. However, if there is no subband configured for a particular BWP, the UE may report the BWP dedicated TDM pattern.

Figure 4C:
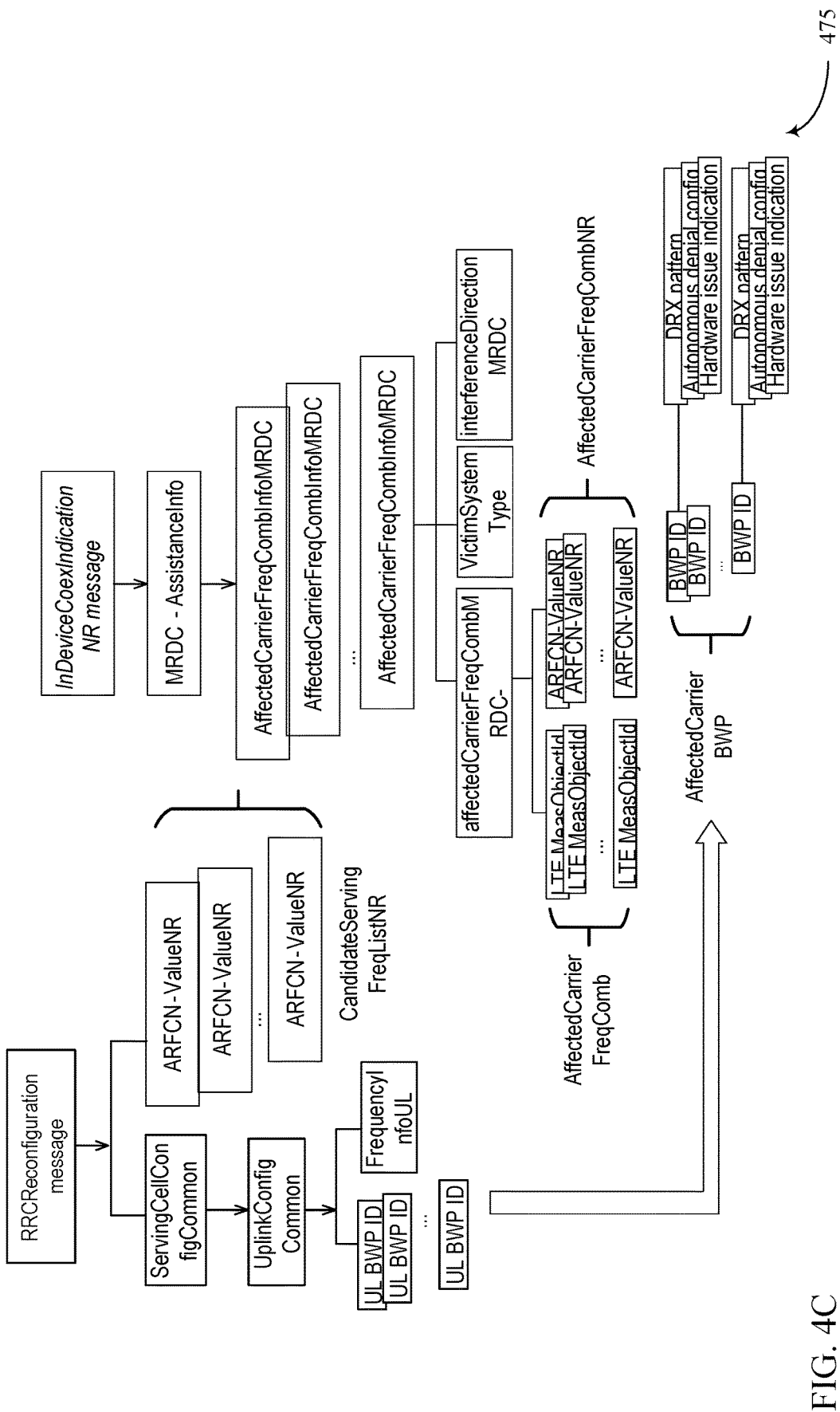
FIG. 4C is an example of messaging architecture of another example of mitigating IDC interference in accordance with aspects of the present disclosure.

FIG. 4C is an example of messaging architecture 475 of another example of mitigating IDC interference in accordance with aspects of the present disclosure. In this example, the UE may monitor the entire bandwidth (e.g., entire 400 MHz wideband carrier in above example) and indicate the affected BWP ID(s) to the base station in an IDC interference indication message (e.g., "IndeviceCoexIndiciationNR message") for each of the corresponding BWPs for which the UE experiences IDC interference. In some examples, in addition to the affected BWP ID, the UE may again also report the specific preferred TDM pattern (e.g., BWP dedicated TDM pattern), including but not limited to the discontinuous reception (DRX) pattern (e.g., DRX cycle length, DRX offset, and/or DRX active time), autonomous denial configuration (e.g., maximum number of denied subframes, validity period), hardware issue indication, etc.

Figure 5:
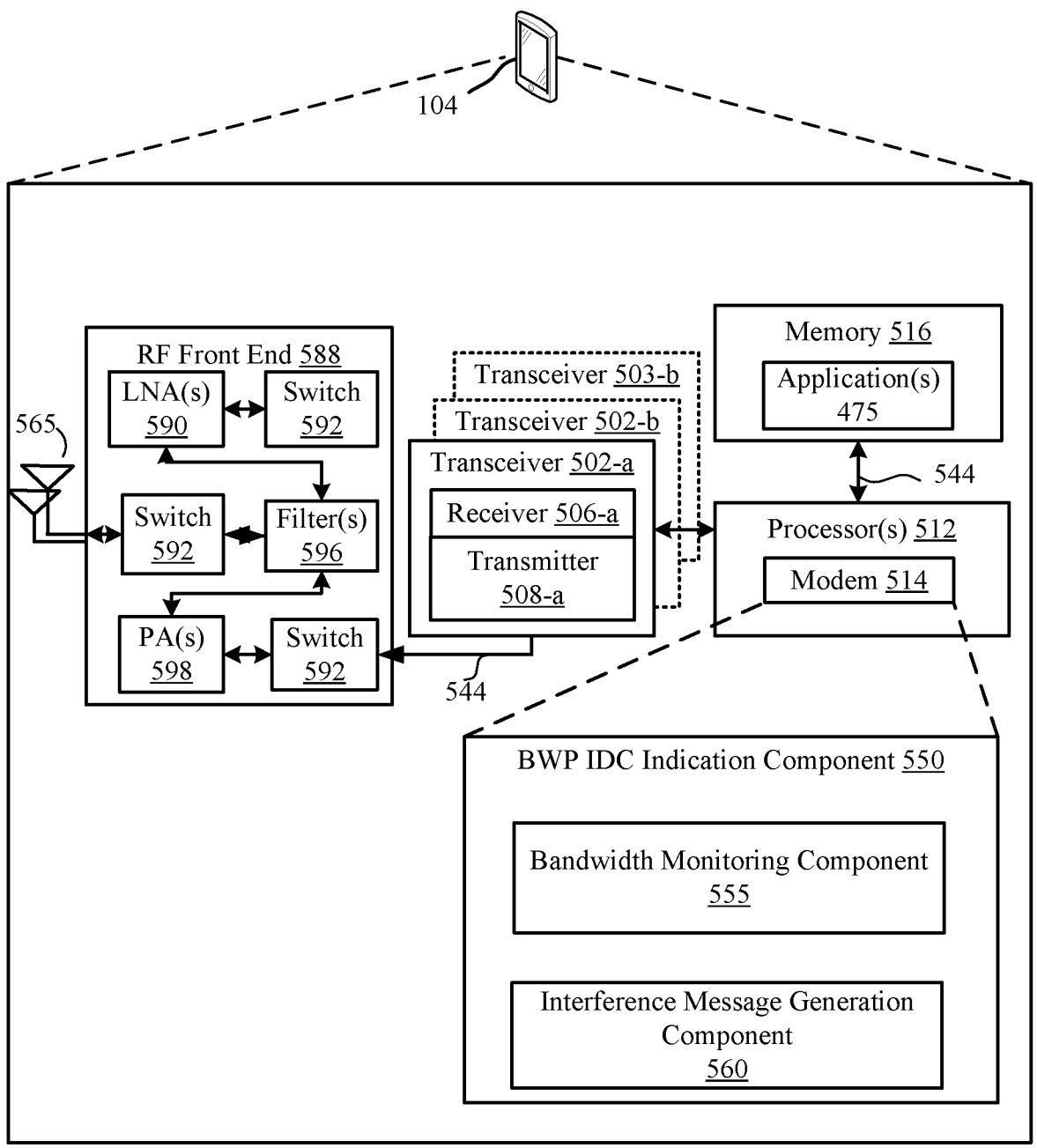
FIG. 5 illustrates a hardware components and subcomponents of a device that may be UE for implementing one or more methods described herein in accordance with various aspects of the present disclosure.

FIG. 5 illustrates a hardware components and subcomponents of a device that may be UE 104 for implementing one or more methods (e.g., method 600) described herein in accordance with various aspects of the present disclosure. For example, one example of an implementation of the UE 104 may include a variety of components, some of which have already been described above, but including components such as one or more processors 512, memory 516 and transceiver 502 in communication via one or more buses 544, which may operate in conjunction with the BWP IDC Indication Component 550 to perform functions described herein related to including one or more methods (e.g., 600) of the present disclosure. In some example, the UE 104 may include a plurality of transceivers 502, each associated with a different RAT. For example, the UE 104 may include a first RAT transceiver 502-*a* (also see 205-*a* in FIG. 2) for communicating with a first network over a first RAT communication link, a second RAT transceiver 502-*b* for communicating with a second network over a second RAT communication link, a third RAT transceiver 502-*c* for communication with a third network over a third RAT communication link, etc. In some examples, the UE 104 may activate multiple transceivers 502 simultaneously to communicate over multiple networks at the same time (e.g., receive 5G communication over first transceiver 502-*a* and Wi-Fi communication over second transceiver 502-*b*).

In some examples, the BWP IDC Indication Component 550 may include a bandwidth monitoring component 555 for monitoring at least one or more BWPs or entire bandwidth carrier for IDC interference from signals received at multiple receives from different RATs. The BWP IDC Indication Component 550 may also include an interference message generation component 560 for generating the IDC interference indication message that identifies the BWP ID(s) over which the UE experiences IDC interference from multiple collocated transceivers.

The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 may include a modem 514 that uses one or more modem processors. The various functions related to BWP IDC Indication Component 550 may be included in modem 514 and/or processors 512 and, in an aspect, may be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with BWP IDC Indication Component 550 may be performed by transceiver 502. The one or more antennas 565 may include stand-alone antennas and/or antenna arrays.

The memory 516 may be configured to store data used herein and/or local versions of application(s) 575 or BWP IDC Indication Component 550 and/or one or more of its subcomponents being executed by at least one processor 512. The memory 416 may include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining BWP IDC Indication Component 550 and/or one or more of its subcomponents, and/or data associated therewith, when the UE 104 is operating at least one processor 512 to execute BWP IDC Indication Component 550 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104 and/or base station 102. Additionally, receiver 506 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102 or wireless transmissions transmitted to and by UE 104. The RF front end 588 may be connected to one or more antennas 565 and may include one or more low-noise amplifiers (LNAs) 590, one or more switches 592, one or more power amplifiers (PAs) 598, and one or more filters 596 for transmitting and receiving RF signals.

In an aspect, the LNA 590 may amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 may be used by the RF front end 588 to filter a received signal to obtain an input RF signal. Similarly, in an aspect, for example, a respective filter 596 may be used to filter an output from a respective PA 598 to produce an output signal for transmission. In an aspect, each filter 596 may be connected to a specific LNA 590 and/or PA 598. In an aspect, the RF front end 588 may use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 588. In an aspect, the transceiver 502 may be tuned to operate at specified frequencies such that transmitting device may communicate with, for example, one or more base stations 102 or one or more cells associated with one or more base stations 102. In an aspect, for example, the modem 514 may configure the transceiver 502 to operate at a specified frequency and power level based on the configuration of the transmitting device and the communication protocol used by the modem 514.

In an aspect, the modem 514 may be a multiband-multimode modem, which may process digital data and communicate with the transceiver 502 such that the digital data is sent and received using the transceiver 502. In an aspect, the modem 514 may be multiband and be configured to support multiple frequency bands for a specific communications protocol. In an aspect, the modem 514 may be multimode and be configured to support multiple operating networks and communications protocols. In an aspect, the modem 514 may control one or more components of transmitting device (e.g., RF front end 588, transceiver 502) to enable transmission and/or reception of signals from the network based on a specified modem configuration. In an aspect, the modem configuration may be based on the mode of the modem 514 and the frequency band in use. In another aspect, the modem configuration may be based on UE configuration information associated with transmitting device as provided by the network during cell selection and/or cell reselection.

Figure 6:
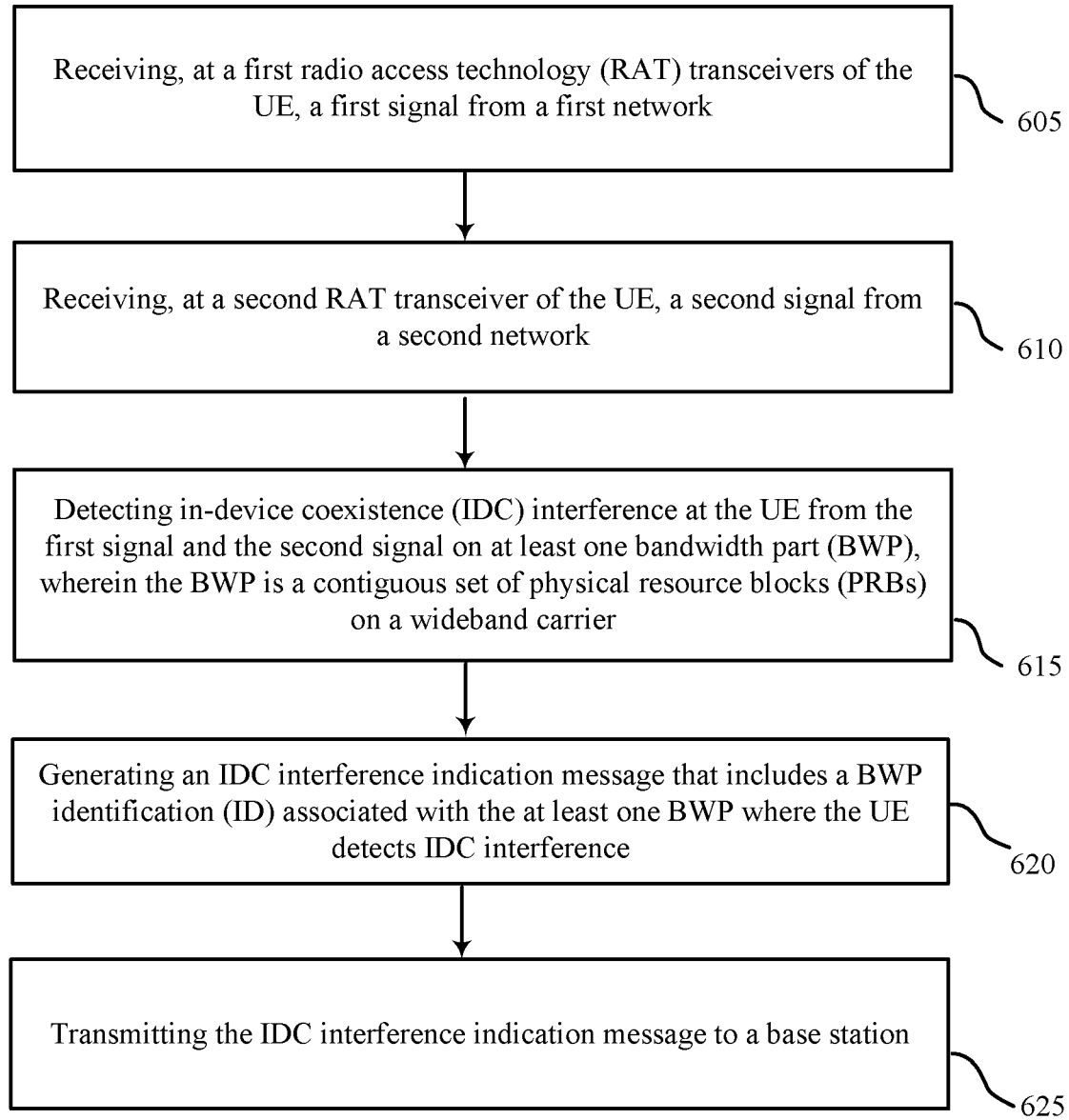
FIG. 6 is a flow diagram of an example of a method of wireless communication implemented by the IAB parent node in accordance with aspects of the present disclosure.

FIG. 6 is a flowchart of an example method 600 for wireless communications in accordance with aspects of the present disclosure. The method 600 may be performed using the UE 104 discussed with reference to FIGS. 1-3, and 5. Although the method 500 is described below with respect to the elements of the UE 104, other components may be used to implement one or more of the steps described herein.

At block 605, the method 600 may include receiving, at a first radio access technology (RAT) transceivers of the UE, a first signal from a first network. Aspects of block 605 may be performed by first transceiver 502-a and more particularly the receiver 506-a described with reference to FIG. 5. For example, the one or more antennas 565 of the UE 104 may receive electro-magnetic signals from a first RAT network (e.g., base station 102) at a first receiver 506-a. The RF front end 588 of the UE 104 may filter, amplify, and/or extract electrical signals carried by the electro-magnetic signals. The first transceiver 502-a or the first receiver 506-a corresponding to the first RAT may digitize and convert the electrical signals into data and send to the modem 514 of the UE 104. Thus, the modem 514, the first RAT transceiver 502-a, the first RAT receiver 506-a, the RF front end 588, the one or more antennas 565, the one or more processors 512, and/or the UE 512 or one of its subcomponents may define the means for receiving, at a first radio access technology (RAT) transceivers of the UE, a first signal from a first network.

At block 610, the method 600 may include receiving, at a second RAT transceivers of the UE, a second signal from a second network. Aspects of block 610 may be performed by second transceiver 502-b and more particularly the second receiver 506-b described with reference to FIG. 5. For example, the one or more antennas 565 of the UE 104 may receive electro-magnetic signals from a second RAT network (e.g., small cell eNB 150) at a second receiver 506-b. The RF front end 588 of the UE 104 may filter, amplify, and/or extract electrical signals carried by the electro-magnetic signals. The second transceiver 502-b or the second receiver 506-b corresponding to the second RAT may digitize and convert the electrical signals into data and send to the modem 514 of the UE 104. Thus, the modem 514, the second RAT transceiver 502-b, the second RAT receiver 506-b, the RF front end 588, the one or more antennas 565, the one or more processors 512, and/or the UE 512 or one of its subcomponents may define the means for receiving, at a second RAT transceivers of the UE, a second signal from a second network.

At block 615, the method 600 may include detecting IDC interference at the UE from the first signal and the second signal on at least one BWP, wherein the BWP is a contiguous subset of PRBs from a set of PRBs on a wideband carrier. Aspects of block 615 may be performed by the BWP IDC indication component 550 and more particularly the bandwidth monitoring component 555 described with reference to FIG. 5. For example, detecting the IDC interference at the UE may include identifying one or more BWP IDs associated one or more BWPs with each serving frequency for which the UE has been configured by the base station to monitor for IDC interference. In such instance, the BWP IDC indication component 550 may monitor the one or more BWPs for which the UE has been configured by the base station, and detect the IDC interference at the UE from the first signal and the second signal on the at least one BWP from the one or more BWPs monitored by the UE. Thus, in instances where network configures BWP ID associated with each serving frequency for which the UE reports IDC problems in InDeviceCoexIndicationNR message, the UE will only check whether the configured BWP(s) in each serving frequency experiencing IDC issue, and report the BWP ID(s) besides affected frequency list.

In some examples, the UE 104 may further receive a subband configuration for one or more subbands associated with the one or more BWP IDs from the base station for which the UE monitors for the IDC interference. The subband configuration may include subband ID and a frequency location of the subband for which the UE monitors for the IDC interference. In such instance, BWP IDC indication component 550 may monitor the configured subbands based on the configuration information for IDC interference and report the subband ID (along with subband dedicated TDM pattern to the base station when IDC interference is detected at the subband associated with the subband ID).

In other examples, detecting the IDC interference at the UE from the first signal and the second signal on the at least one BWP may comprise monitoring an entire bandwidth on a serving frequency for the IDC interference, and detecting the IDC interference at the UE from the first signal and the second signal on the at least one BWP from the one or more BWPs monitored by the UE.

Thus, with respect to aspects of block 615, the modem 514, the one or more processors 512, the UE 512, the BWP IDC indication component 550, and/or bandwidth monitoring component 550 or one of its subcomponents may define the means for detecting IDC interference at the UE from the first signal and the second signal on at least one BWP, wherein the BWP is a contiguous set of PRBs on a wideband carrier.

At block 620, the method 600 may include generating an IDC interference indication message that includes a BWP ID associated with the at least one BWP where the UE detects IDC interference. Aspects of block 620 may be performed by the BWP IDC indication component 550 and more particularly the interference message generation component 560 described with reference to FIG. 5. For example, the IDC interference indication message may include the BWP ID associated with the at least one BWP where the UE detects IDC interference, further includes one or more of: BWP dedicated TDM pattern, DRX pattern, autonomous denial configuration, or hardware issue indication. As noted above with respect to sub-band level IDC reporting, the IDC interference indication message may include the subband ID along with subband dedicated TDM pattern to the base station when IDC interference is detected at the subband associated with the subband ID. Thus, the modem 514, the one or more processors 512, the UE 512, the BWP IDC indication component 550, and/or interference message generation component 560 or one of its subcomponents may define the means generating an IDC interference indication message that includes a BWP ID associated with the at least one BWP where the UE detects IDC interference.

At block 625, the method 600 may include transmitting the IDC interference indication message to a base station. Aspects of block 625 may be performed by transceiver 502 described with reference to FIG. 5. The modem 550 of the UE 104 may generate data corresponding to the IDC interference indication message for transmission to the transceiver 502 or the transmitter 508 of the UE 104. The transceiver 502 or the transmitter 508 may convert the data into electrical signals. The RF front end 588 may filter and/or amplify the electrical signals into the electro-magnetic signals. The one or more antennas 565 of the UE 104 may transmit the electro-magnetic signals associated with the uplink traffic to the base station 102 over uplink channel. Thus, the modem 550, the transceiver 502, the transmitter 508, the RF front end 588, the one or more antennas 565, the one or more processors 512, and/or the UE 104 or one of its subcomponents may define the means for transmitting the IDC interference indication message to a base station.

Figure 7:
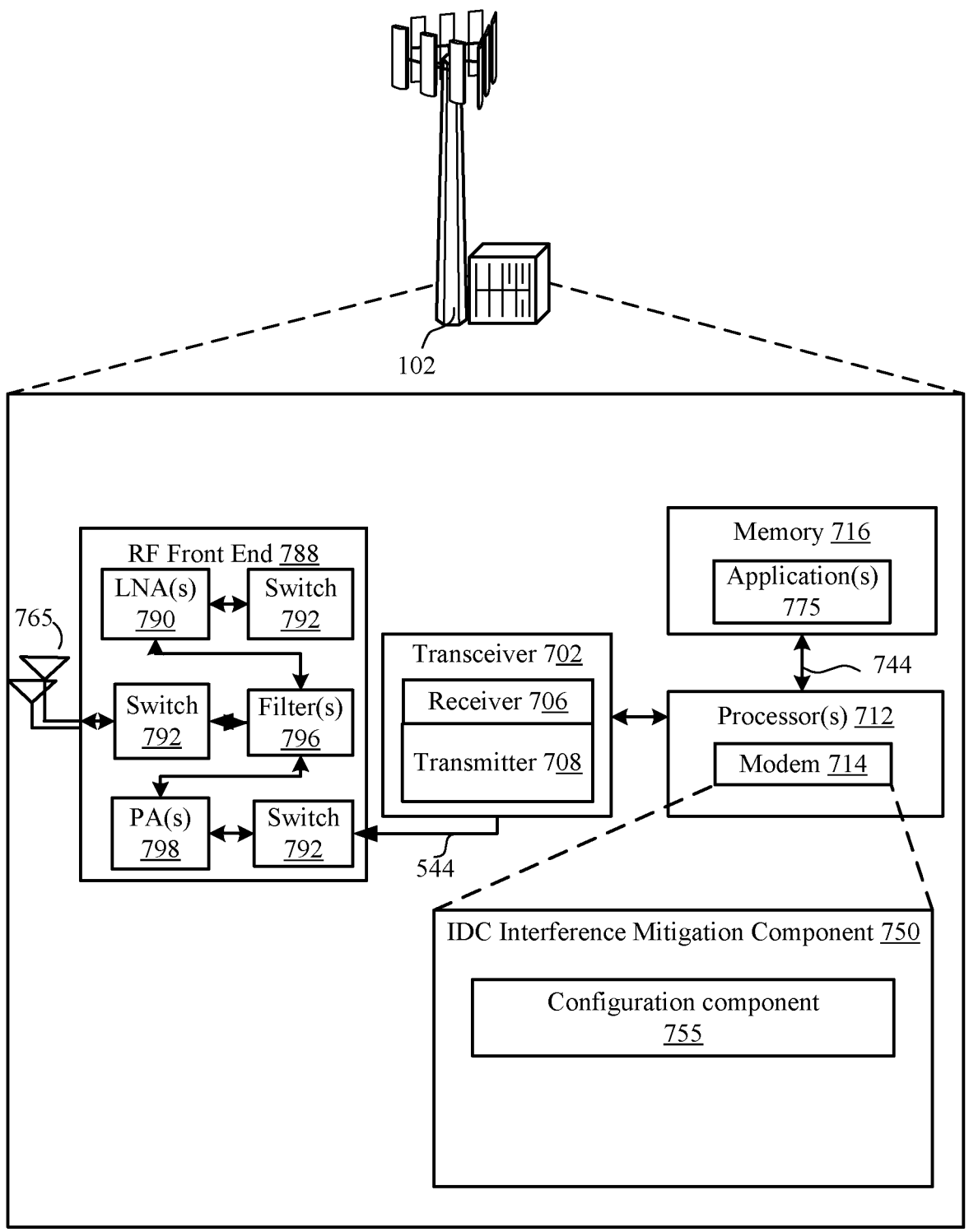
FIG. 7 illustrates a hardware components and subcomponents of a device that may be base station for implementing one or more methods described herein in accordance with various aspects of the present disclosure.

FIG. 7 illustrates a hardware components and subcomponents of a device that may be base station 102 for implementing one or more methods (e.g., method 700) described herein in accordance with various aspects of the present disclosure. For example, one example of an implementation of the base station 102 may include a variety of components, some of which have already been described above, but including components such as one or more processors 712, memory 716 and transceiver 702 in communication via one or more buses 744, which may operate in conjunction with the IDC interference mitigation component 750 to perform functions described herein related to including one or more methods (e.g., 700) of the present disclosure. In some example, the base station 102 may include a plurality of transceivers 702.

The one or more processors 712, modem 714, memory 716, transceiver 702, RF front end 88 and one or more antennas 765, may be configured to support voice and/or data calls (simultaneously or non-simultaneously) in one or more radio access technologies. In an aspect, the one or more processors 712 may include a modem 714 that uses one or more modem processors. The various functions related to IDC interference mitigation component 750 may be included in modem 714 and/or processors 712 and, in an aspect, may be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with IDC interference mitigation component 750 may be performed by transceiver 702. The one or more antennas 765 may include stand-alone antennas and/or antenna arrays.

The memory 716 may be configured to store data used herein and/or local versions of application(s) 775 or IDC interference mitigation component 750 and/or one or more of its subcomponents being executed by at least one processor 712. The memory 716 may include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, the memory 716 may be a non-transitory computer-readable storage medium that stores one or more computer-executable codes defining IDC interference mitigation component 750 and/or one or more of its subcomponents, and/or data associated therewith, when the UE 104 is operating at least one processor 712 to execute IDC interference mitigation component 750 and/or one or more of its subcomponents.

The transceiver 702 may include at least one receiver 706 and at least one transmitter 708. The receiver 706 may include hardware, firmware, and/or software code executable by a processor for receiving data, the code comprising instructions and being stored in a memory (e.g., computer-readable medium). The receiver 706 may be, for example, a radio frequency (RF) receiver. In an aspect, the receiver 706 may receive signals transmitted by at least one UE 104 and/or base station 102. Additionally, receiver 706 may process such received signals, and also may obtain measurements of the signals, such as, but not limited to, Ec/Io, SNR, RSRP, RSSI, etc. The transmitter 708 may include hardware, firmware, and/or software code executable by a processor for transmitting data, the code comprising instructions and being stored in a memory (e.g., computer-readable medium). A suitable example of the transmitter 708 may including, but is not limited to, an RF transmitter.

Moreover, in an aspect, transmitting device may include the RF front end 788, which may operate in communication with one or more antennas 765 and transceiver 702 for receiving and transmitting radio transmissions, for example, wireless communications transmitted by at least one base station 102 or wireless transmissions transmitted to and by UE 104. The RF front end 588 may be connected to one or more antennas 765 and may include one or more low-noise amplifiers (LNAs) 790, one or more switches 792, one or more power amplifiers (PAs) 798, and one or more filters 796 for transmitting and receiving RF signals.

In an aspect, the LNA 790 may amplify a received signal at a desired output level. In an aspect, each LNA 790 may have a specified minimum and maximum gain values. In an aspect, the RF front end 788 may use one or more switches 792 to select a particular LNA 790 and its specified gain value based on a desired gain value for a particular application.

Further, for example, one or more PA(s) 798 may be used by the RF front end 788 to amplify a signal for an RF output at a desired output power level. In an aspect, each PA 798 may have specified minimum and maximum gain values. In an aspect, the RF front end 788 may use one or more switches 792 to select a particular PA 798 and its specified gain value based on a desired gain value for a particular application.

Also, for example, one or more filters 796 may be used by the RF front end 788 to filter a received signal to obtain an input RF signal. Similarly, in an aspect, for example, a respective filter 796 may be used to filter an output from a respective PA 798 to produce an output signal for transmission. In an aspect, each filter 796 may be connected to a specific LNA 790 and/or PA 798. In an aspect, the RF front end 788 may use one or more switches 792 to select a transmit or receive path using a specified filter 796, LNA 790, and/or PA 798, based on a configuration as specified by the transceiver 702 and/or processor 712.

As such, the transceiver 702 may be configured to transmit and receive wireless signals through one or more antennas 765 via the RF front end 788. In an aspect, the transceiver 702 may be tuned to operate at specified frequencies such that transmitting device may communicate with, for example, one or more UEs 104 or one or more cells associated with one or more base stations 102. In an aspect, for example, the modem 714 may configure the transceiver 702 to operate at a specified frequency and power level based on the configuration of the transmitting device and the communication protocol used by the modem 714.

In an aspect, the modem 714 may be a multiband-multimode modem, which may process digital data and communicate with the transceiver 702 such that the digital data is sent and received using the transceiver 702. In an aspect, the modem 714 may be multiband and be configured to support multiple frequency bands for a specific communications protocol. In an aspect, the modem 714 may be multimode and be configured to support multiple operating networks and communications protocols. In an aspect, the modem 714 may control one or more components of transmitting device (e.g., RF front end 788, transceiver 702) to enable transmission and/or reception of signals from the network based on a specified modem configuration. In an aspect, the modem configuration may be based on the mode of the modem 714 and the frequency band in use. In another aspect, the modem configuration may be based on UE configuration information associated with transmitting device as provided by the network during cell selection and/or cell reselection.

Figure 8:
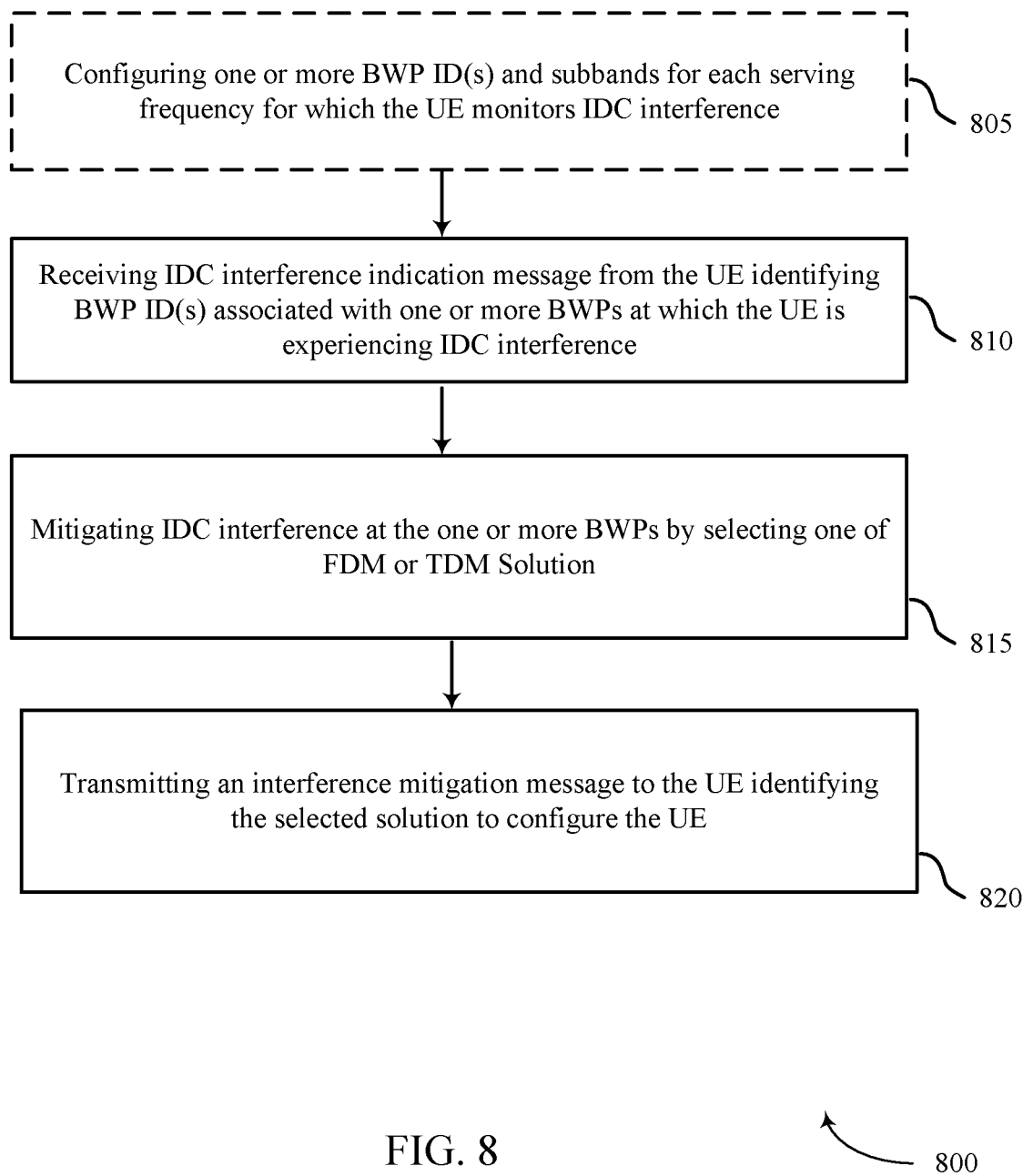
FIG. 8 is a flowchart of an example method for wireless communications in accordance with aspects of the present disclosure.

FIG. 8 is a flowchart of an example method 800 for wireless communications in accordance with aspects of the present disclosure. The method 800 may be performed using the base station 102 discussed with reference to FIGS. 1-3, and 7. Although the method 800 is described below with respect to the elements of the base station 102, other components may be used to implement one or more of the steps described herein.

At block 805, the method 800 may include configuring one or more BWP ID(s) and subbands for each serving frequency for which the UE may monitor IDC interference and report to the base station. Aspects of block 805 may be performed by IDC interference mitigation component 750, and more particularly the configuration component 755 described with reference to FIG. 7.

At block 810, the method 800 may include receiving IDC interference indication message from the UE identifying BWP ID(s) experiencing IDC interference at the UE. Aspects of block 810 may be performed by transceiver 702 described with reference to FIG. 7.

At block 815, the method 800 may include determining an IDC interference mitigation solution to implement for the UE at the one or more BWPs in response to receiving the IDC interference indication message, wherein the IDC interference mitigation solution includes one of frequency division multiplexing (FDM) or time division multiplexing (TDM) communication between the UE and the base station on the at least one or more BWPs. Aspects of block 815 may be performed by IDC interference mitigation component 750 described with reference to FIG. 7.

At block 820, the method 800 may include transmitting an interference mitigation message to the UE identifying the IDC interference mitigation solution, wherein the UE configures its communication with the base station based on the IDC interference mitigation solution. Aspects of block 820 may be performed by the transceiver 702 described with reference to FIG. 7.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications at a user equipment (UE), comprising:
   receiving, at a first radio access technology (RAT) transceiver of the UE, a first signal from a first network;
   receiving, at a second RAT transceiver of the UE, a second signal from a second network;
   detecting in-device coexistence (IDC) interference at the UE from the first signal and the second signal on at least one bandwidth part (BWP), wherein the BWP is a contiguous subset of physical resource blocks (PRBs) from a set of PRBs on a wideband carrier;
   generating an IDC interference indication message that includes a BWP identification (ID) associated with the at least one BWP where the UE detects IDC interference; and
   transmitting the IDC interference indication message to a base station.

2. The method of claim 1, wherein detecting the IDC interference at the UE from the first signal and the second signal on the at least one BWP, comprises:
   identifying one or more BWP IDs associated one or more BWPs with each serving frequency for which the UE has been configured by the base station to monitor for IDC interference;
   monitoring only the one or more BWPs for which the UE has been configured by the base station; and
   detecting the IDC interference at the UE from the first signal and the second signal on the at least one BWP from the one or more BWPs monitored by the UE.

3. The method of claim 2, further comprising:
   receiving a subband configuration for one or more subbands associated with the one or more BWP IDs from the base station for which the UE monitors for the IDC interference, wherein the subband configuration includes subband ID and a frequency location of the subband for which the UE monitors for the IDC interference.

4. The method of claim 3, wherein the subband configuration from the base station includes one or more reusing subbands configured for channel state information (CSI) reporting, configuring starting frequency location and ending frequency location for each subband, or configuring central frequency location and bandwidth for each subband.

5. The method of claim 1, wherein detecting the IDC interference at the UE from the first signal and the second signal on the at least one BWP, comprises:
monitoring an entire bandwidth on a serving frequency for the IDC interference; and
detecting the IDC interference at the UE from the first signal and the second signal on the at least one BWP from the one or more BWPs monitored by the UE.

6. The method of claim 1, wherein the IDC interference indication message further includes one or more of BWP dedicated time division multiplex (TDM) pattern, discontinuous reception (DRX) pattern, autonomous denial configuration, or hardware issue indication.

7. The method of claim 1, further comprising:
receiving, at the UE, an IDC interference mitigation message from the base station in response to the IDC interference indication message.

8. A user equipment (UE) for wireless communications, comprising:
a memory configured to store instructions;
a processor communicatively coupled with the memory, the processor configured to execute the instructions to:
receive, at a first radio access technology (RAT) transceiver of the UE, a first signal from a first network;
receive, at a second RAT transceiver of the UE, a second signal from a second network;
detect in-device coexistence (IDC) interference at the UE from the first signal and the second signal on at least one bandwidth part (BWP), wherein the BWP is a contiguous subset of physical resource blocks (PRBs) from a set of PRBs on a wideband carrier;
generate an IDC interference indication message that includes a BWP identification (ID) associated with the at least one BWP where the UE detects IDC interference; and
transmit the IDC interference indication message to a base station.

9. A non-transitory computer readable medium storing instructions, executable by a processor of a user equipment (UE), for wireless communications, comprising instructions for:
receiving, at a first radio access technology (RAT) transceiver of the UE, a first signal from a first network;
receiving, at a second RAT transceiver of the UE, a second signal from a second network;
detecting in-device coexistence (IDC) interference at the UE from the first signal and the second signal on at least one bandwidth part (BWP), wherein the BWP is a contiguous subset of physical resource blocks (PRBs) from a set of PRBs on a wideband carrier;
generating an IDC interference indication message that includes a BWP identification (ID) associated with the at least one BWP where the UE detects IDC interference; and
transmitting the IDC interference indication message to a base station.

10. An apparatus for wireless communications implemented on a user equipment (UE), comprising:
means for receiving, at a first radio access technology (RAT) transceiver of the UE, a first signal from a first network;
means for receiving, at a second RAT transceiver of the UE, a second signal from a second network;
means for detecting in-device coexistence (IDC) interference at the UE from the first signal and the second signal on at least one bandwidth part (BWP), wherein the BWP is a contiguous subset of physical resource blocks (PRBs) from a set of PRBs on a wideband carrier;
means for generating an IDC interference indication message that includes a BWP identification (ID) associated with the at least one BWP where the UE detects IDC interference; and
means for transmitting the IDC interference indication message to a base station.

11. A method of wireless communication implemented by a base station, comprising:
receiving, at the base station, an IDC interference indication message from a user equipment (UE) identifying at least one or more bandwidth part (BWP) identifications ID(s) associated with one or more BWPs at which the UE is experiencing IDC interference;
determining an IDC interference mitigation solution to implement for the UE at the one or more BWPs in response to receiving the IDC interference indication message, wherein the IDC interference mitigation solution includes one of frequency division multiplexing (FDM) or time division multiplexing (TDM) communication between the UE and the base station on the at least one or more BWPs; and
transmitting an interference mitigation message to the UE identifying the IDC interference mitigation solution, wherein the UE configures its communication with the base station based on the IDC interference mitigation solution.

12. A base station for wireless communications, comprising:
a memory configured to store instructions; and
a processor communicatively coupled with the memory, the processor configured to execute the instructions to:
receive, at the base station, an IDC interference indication message from a user equipment (UE) identifying at least one or more bandwidth part (BWP) identifications ID(s) associated with one or more BWPs at which the UE is experiencing IDC interference;
determine an IDC interference mitigation solution to implement for the UE at the one or more BWPs in response to receiving the IDC interference indication message, wherein the IDC interference mitigation solution includes one of frequency division multiplexing (FDM) or time division multiplexing (TDM) communication between the UE and the base station on the at least one or more BWPs; and
transmit an interference mitigation message to the UE identifying the IDC interference mitigation solution, wherein the UE configures its communication with the base station based on the IDC interference mitigation solution.

13. A non-transitory computer readable medium storing instructions, executable by a processor of a base station, for wireless communications, comprising instructions for:
receiving, at the base station, an IDC interference indication message from a user equipment (UE) identifying at least one or more bandwidth part (BWP) identifications ID(s) associated with one or more BWPs at which the UE is experiencing IDC interference;
determining an IDC interference mitigation solution to implement for the UE at the one or more BWPs in response to receiving the IDC interference indication message, wherein the IDC interference mitigation solution includes one of frequency division multiplexing (FDM) or time division multiplexing (TDM) communication between the UE and the base station on the at least one or more BWPs; and transmitting an interference mitigation message to the UE identifying the IDC interference mitigation solution, wherein the UE configures its communication with the base station based on the IDC interference mitigation solution.

14. An apparatus for wireless communications implemented on a base station, comprising:

means for receiving, at the base station, an IDC interference indication message from a user equipment (UE) identifying at least one or more bandwidth part (BWP) identifications ID(s) associated with one or more BWPs at which the UE is experiencing IDC interference;

means for determining an IDC interference mitigation solution to implement for the UE at the one or more BWPs in response to receiving the IDC interference indication message, wherein the IDC interference mitigation solution includes one of frequency division multiplexing (FDM) or time division multiplexing (TDM) communication between the UE and the base station on the at least one or more BWPs; and means for transmitting an interference mitigation message to the UE identifying the IDC interference mitigation solution, wherein the UE configures its communication with the base station based on the IDC interference mitigation solution.

\* \* \* \* \*